Figure 1:
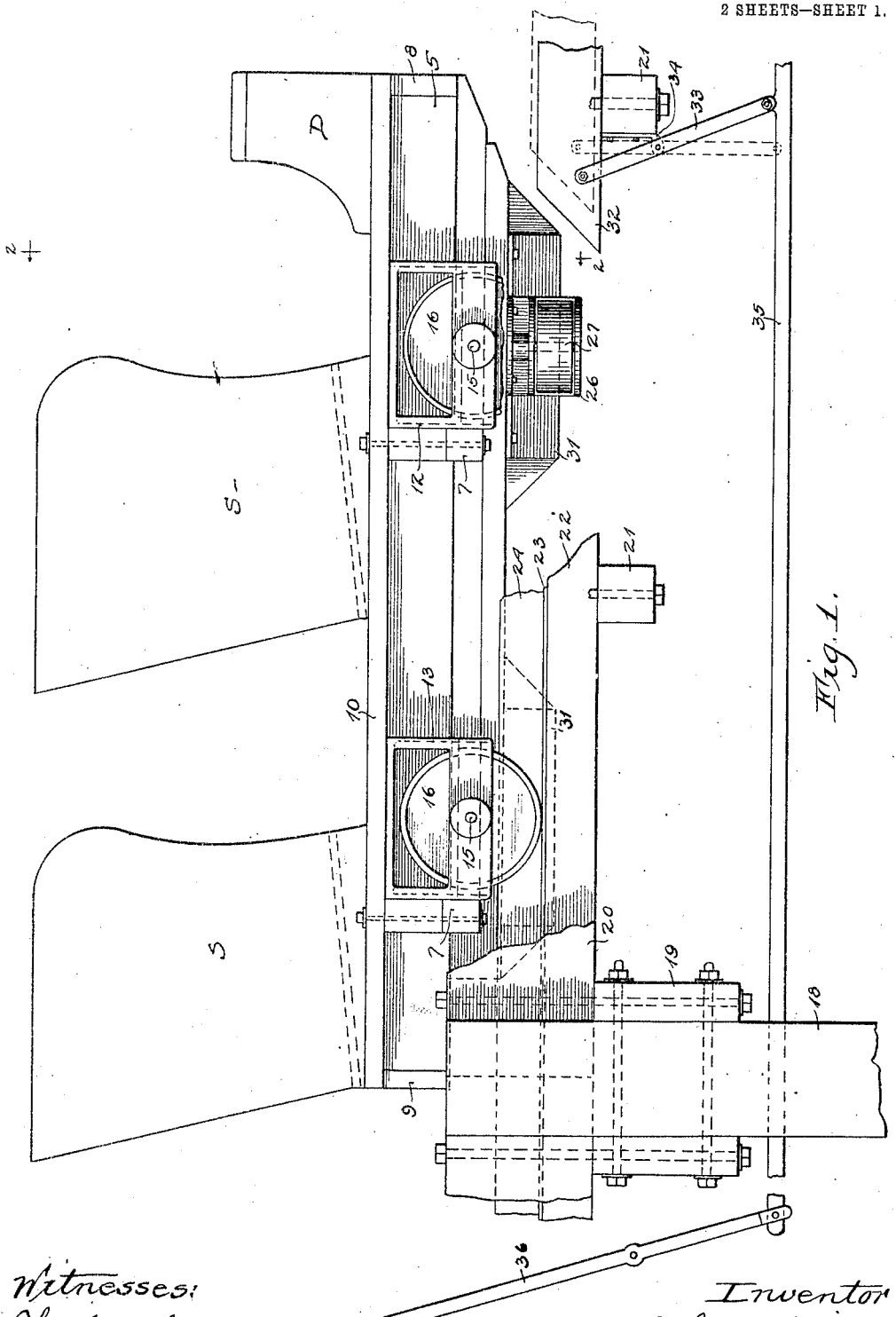

J. A. MILLER.
PLEASURE RAILWAY.
APPLICATION FILED JAN. 19, 1912.

1,037,958.

Patented Sept. 10, 1912.

2 SHEETS—SHEET 1.

Witnesses:
Charles J. Schmidt.
Willie D. Dearborn

Inventor:
John A. Miller
By Offield, Towle, Graves & Offield
Att'ys.

J. A. MILLER.
PLEASURE RAILWAY.
APPLICATION FILED JAN. 19, 1912.
1,037,958.
Patented Sept. 10, 1912.
2 SHEETS—SHEET 2.
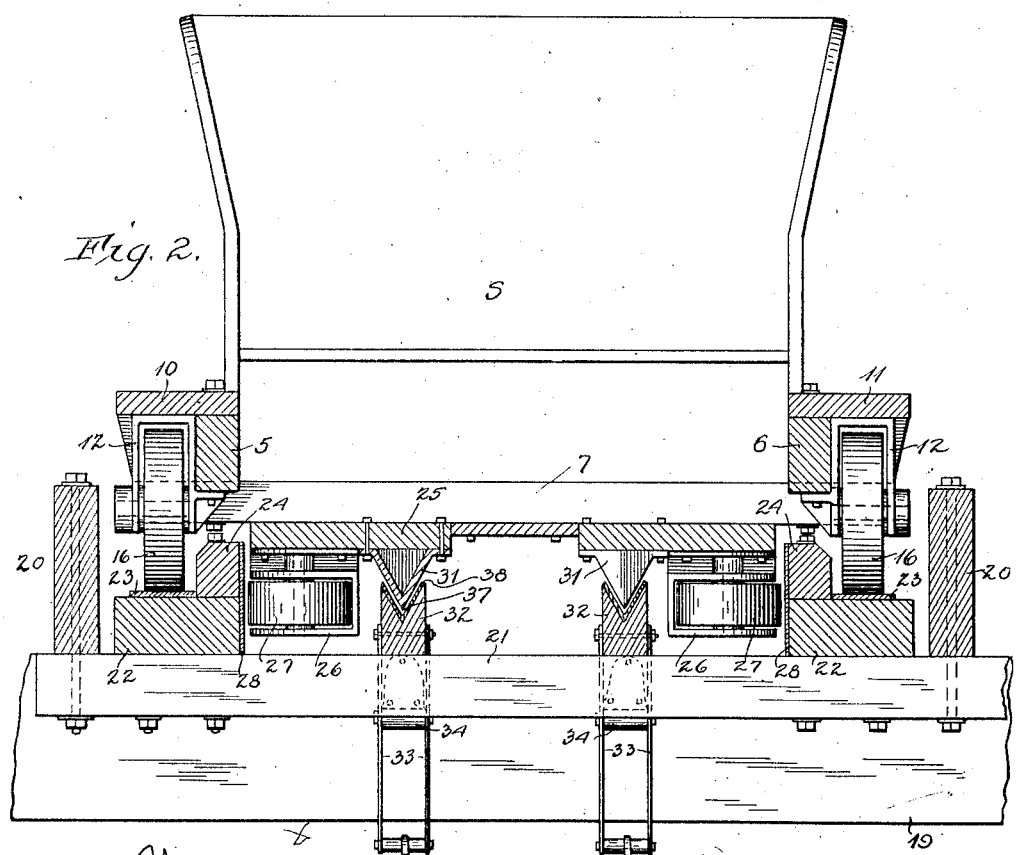
Witnesses:
Charles J. Schmidt.
Willis D. Dearborn
Inventor:
John A. Miller
By Offield, Towle, Graves & Offield
Attys.

UNITED STATES PATENT OFFICE.

JOHN A. MILLER, OF HOMEWOOD, ILLINOIS.

PLEASURE-RAILWAY.

1,037,958.  Specification of Letters Patent.  Patented Sept. 10, 1912.

Application filed January 19, 1912. Serial No. 672,171.

*To all whom it may concern:*

Be it known that I, JOHN A. MILLER, residing at Homewood, in the county of Cook and State of Illinois, have invented certain new and useful Improvements in Pleasure-Railways, of which the following is a full, clear, and precise specification.

My invention relates to pleasure railways, and contemplates improved construction and operation for brake mechanism for the cars.

Among the important objects of the invention are to provide improved brake shoes on the cars and improved brake beams disposed at intervals along the track structure, so that a car may be stopped at various points along its route should accidents, for example, occur; to provide brake mechanisms which can be both positively and automatically controlled; to provide such control for the brake beams that the force of gravity will tend to hold them in operative position; and to provide releasable means for some of the brake beams to normally resist the force of gravity and to hold the beam in inoperative position, and to provide means controllable from a distance for tripping the releasing means to allow the force of gravity to operate to set the brake beams for operation; to provide such construction and coöperation of the brake mechanisms on the cars and road-bed that the weight of the car will be instrumental in effecting braking relations and so that the braking effort will be directly proportional to the weight of the car; to provide such construction of the brake mechanism parts on the car and road-bed that the car brake shoes can readily center themselves on the brake beams; and in general to provide more efficient, more reliable and more safe braking mechanism for pleasure railways.

My invention will be fully understood from the accompanying drawings showing a preferred arrangement, and in these drawings Figure 1 is a side elevational view of a car and track structure, together with one form of braking mechanism, Fig. 2 is a sectional view looking from plane 2—2, Fig. 1, Fig. 3 is a side elevational view of the upper part of the track structure with parts broken away to more clearly illustrate the operation of brake members supported on the structure, and Fig. 4 shows a modified form of brake shoe and brake beam construction.

The body of the car shown comprises side beams 5 and 6 connected together by cross beams 7 and the front and end walls 8 and 9. Engaging the tops of the side beams 5 and 6 and extending laterally therefrom are the running boards 10 and 11. The body also supports a number of seats S and a dash-board structure D. At the opposite sides of the car body are front and rear wheel journal frames 12 and 13 secured to the side beams and below the running-boards, the frames pivoting axles 15 of wheels 16 which support the car.

In the track supporting structure shown each of the bents comprises the upright side beams 18 connected together at the top by a pair of cross beams 19. Set on edge on these cross beams and securely bolted thereto are sleepers 20, ties 21 being suspended at intervals from the sleeper beams for supporting the rail structures. The rail structures are preferably of L-shaped cross-section, each comprising a base part 22 for supporting a flat rail 23 for the car wheels, beams 24 being secured on the base portions along the inner edge thereof to form guards for limiting the lateral play of the car. The floor 25 of the car is supported from the cross beams 7, and secured to the under side of the floor adjacent each of the car wheels is a bearing bracket 26 for journaling the guard roller 27 for engaging flat rails 28 secured to the inner faces of the base portions and the guard beams 24 of the track structure.

Coming now to the brake mechanism, a brake shoe structure 31 is secured to the under side of the car floor adjacent each of the guard wheel bearing frames, the brake shoe structures shown in Figs. 1 and 2 being in the form of castings of V-shaped transverse section whose ends are of inverted plow shape. For frictionally receiving these brake shoes brake beams 32 are provided at suitable points along the track structure, and in the arrangement shown in Figs. 1 and 2, each brake beam is carried at the upper ends of levers 33 pivoted at intermediate points to suitable castings 34 bolted to the ties of the track supporting structure, the lower ends of the levers pivoting to an actuating bar 35 adapted to move longitudinally by a main lever 36 pivoted at its lower end to the bar and pivoted at an intermediate point to the track supporting structure. Each brake beam has a V-shaped longitudinal groove 37, and if the beams are of wood the sides of the grooves are preferably faced with sheet metal 38. These brake beams are in position on the ties in the paths of the brake shoes on each side of the car. As shown in Figs. 1 and 2, the brake beams are resting on the ties, so as to allow free passage of the car thereover, and if it is desired to brake the car at any point, a corresponding lever 36 is swung to cause corresponding swing of the levers 33 and raising of the brake beam into the path of the brake shoes of the approaching car. The brake beams at the home platform are preferably continuously raised to assure stopping of the car at this point, while the brake beams at other points along the track are normally down but ready to be quickly raised by actuation of levers at the home platform or elsewhere to stop the cars in case of emergency or accident.

As soon as the brake shoes of a car enter brake beams, the frictional engagement will cause the brake beams to swing upwardly on their supporting levers to be thus automatically forced into close engagement with the brake shoes, the brake shoes then supporting considerable weight of the car. Thus the weight of the car will automatically assist in the braking operation, and the frictional engagement and consequently the braking, will be directly proportional to the weight of the car. Longitudinal movement of the brake beams when engaged by the brake shoes will be limited by the abutment of the levers 33 against the ties when the levers are vertical and the brake beams in their uppermost position. The entire track structure is more or less springy and yielding, and the engagement of the brake shoes with the brake beams will be cushioned. After a car has been stopped, the attendant by swinging the proper main lever 36, can withdraw the brake beams away from the brake shoes. The various brake beams can be actuated in much the same manner as switches are actuated in steam railway systems, which levers can be all situated at a common point or can be disposed along the track.

In Fig. 3 a somewhat modified arrangement for brake beam control is illustrated. Instead of pivoting the brake beam supporting levers on castings secured to the ties, as shown in Figs. 1 and 2, beams 39 running parallel with the track are hung from the ties, preferably by means of bolts 40 passing through the ties. Integral links 41 are pivoted at their lower ends to the beam 39 by blocks 42, and at their upper ends are pivoted to brake beams 32 by blocks 44. Weights may be applied in suitable manner which will tend normally to hold the brake beams in upper operative position. As shown, one or more of the links 41 may have an extension 45 carrying at its lower end a weight 46, which weights tend to hang down to keep the links 41 in substantially vertical position to hold the brake beams up. Pivoted to the beam 39 adjacent one of the weight bearing extensions 45 is a bell crank lever 47 having its arm 47' slotted at its end to receive the pivot pin 48 at the end of actuating rod 49 extending to any suitable point to be pivoted to the lower end of a controlling lever 36 which may be pivoted to one of the sleepers 20. The other arm 47" of the tripping lever is adapted to engage with the weight supporting arm. At the home station the tripping link will be in position to allow the weight to hang down to cause the associated brake beams to be held in their upper braking position. At other points along the track the tripping levers have preferably been rotated by their controlling levers 36 to cause the arms 47' to swing the weight arms and to lock them in position, so that the brake beams will be down and out of the path of the car brake shoes, as the brake beams at intermediate points of the track are to be used only for emergency. If at any time it is desired to brake a car along an intermediate point of the track, the corresponding lever 36 is actuated to rotate the corresponding trip levers away from the weight arms, which then swing downwardly to carry the brake beam up into braking position. After a car is stopped at an intermediate point it cannot proceed farther, as the weights will always tend to force the brake beams against the car brake shoes. To release the car the attendant need only actuate the main lever to swing the tripping links against the weight arms, whereby the brake beams are lowered. Suitable means may of course be provided to lock the main levers in position after actuation to release the brake mechanisms. As shown in Fig. 3, a notched segment 50 is mounted adjacent the levers 36 to be engaged by a detent pawl 51 controlled by the grip 52 on the handle in a well-known manner. The main lever rods 49 could of course connect directly with the weight arms 45 in the same manner as in Figs. 1 and 2, and in Fig. 1 the lever rods 45 could be made of sufficient weight so that the tendency will be to swing the links 33 to vertical position to hold the brake beams up.

In Fig. 4 I have shown a preferred arrangement of brake shoe and brake beam construction and arrangement, the brake shoes, instead of being V-shaped as in Figs. 1 and 2, having the longitudinal V-shaped slot 54 in their lower sides, and the brake beams 32 having each a V-shaped crown 55 for engaging in the brake shoe slots. Where the brake beams are of wood these crowns are reinforced by caps 56 in the form of angle irons. This construction is preferably about that shown in Figs. 1 and 2, in that there is no chance for any accumulation of dirt or objects on the brake beams which could interfere with braking operations.

I thus provide very efficient brake mechanism which is particularly adaptable for use in connection with pleasure railways, although the mechanism would be equally effective in other railway systems. In prior systems the entire braking effort was controlled by considerable force exerted on the main levers. But in my arrangement practically no force is required on the main levers except to move them from one position to the other to set the brake beams, the entire braking effort being controlled by the weight of the car and in direct proportion to such weight. The wedging engagement of the brake shoes with the brake beams is also more effective and efficient than the mere flat engagement in prior braking systems, and the entire brake surface is at all times effective. In my arrangement the guard rollers will keep the car well centered transversely so that the brake shoes can engage accurately with the brake beams.

I do not of course desire to be limited to the precise arrangement, construction, operation and control disclosed, as changes and modifications are possible which would still come within the scope of my invention, and I therefore claim the following:

1. In a pleasure railway system, the combination of a track structure for supporting cars, each car carrying a brake member, a brake member supported from the track structure, and means for causing engagement of said brake members during running of a car over the track structure, one of said brake members having a wedge-shaped end and the other brake member having a longitudinal slot for intimately receiving said wedge-shaped end.

2. In a pleasure railway system, the combination of a track structure over which cars may run, a car having a brake shoe depending therefrom, a brake beam on the track structure pivoted thereto to be raised into the path of the brake shoe of the traveling car, and means for raising such brake beams to frictionally receive the brake shoe, the lower and upper ends respectively of the brake shoe and brake beam being formed to enter into wedging engagement with each other when said brake beam is raised.

3. In a pleasure railway system, the combination of a track structure for supporting cars, a brake shoe depending from each car, a brake beam on the track structure in the path of the brake shoe of a traveling car, bars pivoted at their lower ends to the track structure and extending upwardly therefrom and pivoted to said brake beam, said bars being inclined toward the direction from which a car is approaching whereby upon frictional engagement of the brake shoe with the brake beam the beam will be automatically raised into firm frictional engagement with the brake shoe to retard and to stop the car, said brake shoe and brake beam being formed to enter into wedging engagement with each other when brought together.

4. In a pleasure railway system, the combination of a supporting track for cars, each car having a brake shoe depending therefrom, a brake beam mounted on the track structure parallel with and below the direction of travel of the brake shoes on the cars, and gravity controlled mechanism tending to raise and to hold said brake beam in position to frictionally receive the brake shoe of a car attempting to pass thereover.

5. In a pleasure railway system, the combination of a track structure for supporting cars, each car having a brake shoe depending therefrom toward the track structure, a brake beam on the track structure parallel with the path of travel of the brake shoe on an approaching car, levers pivoted to the track structure below said brake beam and pivoted at their upper ends to said brake beam whereby said brake beam may be raised and lowered upon swing of the levers, and gravity controlled means tending to swing said levers toward vertical position to hold the brake beam upwardly to frictionally receive the brake shoe of the approaching car.

6. In a pleasure railway system, the combination of a track structure for supporting cars, each car having a brake shoe depending therefrom toward the track structure, a brake beam on the track structure parallel with the path of travel of the brake shoe on an approaching car, levers pivoted to the track structure below said brake beam and pivoted at their upper ends to said brake beam whereby said brake beam may be raised and lowered upon swing of the levers, gravity controlled means tending to swing said levers toward vertical position to hold the brake beam upwardly to frictionally receive the brake shoe of an approaching car, and means for locking said levers in inclined position to retain the beam in a position below the path of the brake shoes.

7. In a pleasure railway system, the combination of a track structure for supporting cars, each car having a brake shoe depending therefrom toward the track structure, a brake beam on the track structure parallel with the path of travel of the brake shoe on an approaching car, levers pivoted to the track structure below said brake beam whereby said brake beam may be raised and lowered upon swing of the levers, gravity controlled means tending to swing said levers toward vertical position to hold the brake beam upwardly to frictionally receive the brake shoe of an approaching car, and means operable from a distance for moving said levers to inclined position to retain the brake beam below the path of said brake shoes.

8. In a pleasure railway system, the combination of a supporting structure comprising cross ties and rails supported thereon, a beam extending parallel with said rails and suspended from said cross ties, links pivoted to said beam and extending upwardly therefrom, a brake beam to which the upper ends of said links are pivoted, and means for effecting longitudinal movement of said brake beam and thereby vertical adjustment thereof as said links swing, thereby to adjust said brake beam with reference to suitable brake shoes carried by cars traveling on said rails.

9. In a pleasure railway system, the combination of a supporting structure comprising cross ties and rails supported thereon, a beam extending parallel with said rails and suspended from said cross ties, links pivoted to said beam and extending upwardly therefrom, a brake beam to which the upper ends of said links are pivoted, and means for effecting longitudinal movement of said brake beam and thereby vertical adjustment thereof as said links swing, thereby to adjust said brake beam with reference to suitable brake shoes carried by cars traveling on said rails, said link supporting beam being vertically adjustable whereby further adjustment can be effected for said brake beam.

10. In a pleasure railway system, the combination of a track structure comprising cross ties and rails supported thereon, a supporting beam suspended from said cross tie and extending parallel with said rails, links pivoted to said supporting beam and extending upwardly therefrom, a brake beam parallel with said rails being pivotally engaged by the upper ends of said links, a lever pivoted to said supporting beam and to said brake beam and being weighted to tend to hold said links in vertical position and thereby to hold said brake beam in raised position in the path of vertical brake shoes on cars running on said track, and means controlled from a distance for swinging said weighted lever to effect lowering of said brake beam.

In witness whereof, I hereunto subscribe my name this 15th day of January, A. D., 1912.

JOHN A. MILLER.

Witnesses:
CHARLES J. SCHMIDT,
NELLIE B. DEARBORN.